United States Patent [19]

Fujisawa et al.

[11] Patent Number: 5,092,931
[45] Date of Patent: Mar. 3, 1992

[54] METHOD FOR MAKING INSOLUBLE HEAVY METALS CONTAINED IN FLY ASH DISCHARGED FROM INCINERATOR

[75] Inventors: Yoshinari Fujisawa; Yoji Ohgaki; Yuji Yoshii; Tsuneharu Miyachi, all of Tokyo, Japan

[73] Assignee: NKK Corporation, Tokyo, Japan

[21] Appl. No.: 442,331

[22] PCT Filed: Feb. 27, 1989

[86] PCT No.: PCT/JP89/00197
§ 371 Date: Oct. 23, 1989
§ 102(e) Date: Oct. 23, 1989

[87] PCT Pub. No.: WO89/07991
PCT Pub. Date: Sep. 8, 1989

[30] Foreign Application Priority Data

Feb. 29, 1988 [JP] Japan .................................. 63-46987

[51] Int. Cl.$^5$ .............................................. C04B 18/08
[52] U.S. Cl. ...................................... 106/708; 210/728
[58] Field of Search .......................... 210/728; 106/708

[56] References Cited

U.S. PATENT DOCUMENTS 4,053,401 10/1977 Fukushima et al. ................... 210/52
4,442,215 4/1984 Vognsen et al. ..................... 435/262

FOREIGN PATENT DOCUMENTS 59-21675  5/1984 Japan .
63-205192 8/1988 Japan .
63-278589 11/1988 Japan .

*Primary Examiner*—William R. Dixon, Jr.
*Attorney, Agent, or Firm*—Frishauf, Holtz, Goodman & Woodward

[57] ABSTRACT

A method for insolubilizing detrimental heavy metals contained in a fly ash collected from an exhaust gas discharged from an incinerator. For the purpose of making insoluble the heavy metals, a chelating agent comprising a high-molecular compound is added, together with water, to the fly ash, or a chelating agent, a high-molecular compound and water are added to the fly ash, and these substances are kneaded to form a kneaded mass. Reactions are caused in the kneaded mass between these heavy metals and the chelating agent to convert the heavy metals into water-insoluble chelate compounds, and the chelate compounds are coarsened.

19 Claims, 1 Drawing Sheet

METHOD FOR MAKING INSOLUBLE HEAVY METALS CONTAINED IN FLY ASH DISCHARGED FROM INCINERATOR

FIELD OF THE INVENTION

The present invention relates to a method for making insoluble detrimental heavy metals contained in a fly ash collected from an exhaust gas discharged from an incinerator.

BACKGROUND OF THE INVENTION

An exhaust gas produced by incineration of wastes in an incinerator contains detrimental components such as hydrogen chloride and sulfur oxide. In addition, a fly ash collected from the exhaust gas contains detrimental heavy metals such as zinc, lead and cadmium. It is the conventional practice therefore to collect a fly ash from the above-mentioned exhaust gas discharged from the incinerator by means of a dust collector, then remove detrimental components such as hydrogen chloride and sulfur oxide contained in the exhaust gas by means of a wet type gas cleaner using, for example, caustic soda, and then release the thus treated exhaust gas through a chimney to the open air.

A typical chemical composition of the fly ash collected from the exhaust gas as described above is shown in Table 1.

TABLE 1

| (wt. %) | | | | | | | | |
|---|---|---|---|---|---|---|---|---|
| $SiO_2$ | CaO | $Fe_2O_3$ | $Al_2O_3$ | $SO_3$ | MgO | Na | K | Cl |
| 15–25 | 8–20 | 3–7 | 12–21 | 4–8 | 2–6 | 3–8 | 3–9 | 9–16 |

| [mg/Kg] | | | | |
|---|---|---|---|---|
| Zn | Cd | Pb | Total Cr | Total Hg |
| 4000–20000 | 150–500 | 1500–7000 | 230–570 | 2.3–7.5 |

For such a fly ash, which is usually dumped to a land site for reclamation, it is necessary prior to dumping to apply a treatment to make insoluble detrimental heavy metals contained in the fly ash.

For the purpose of making insoluble detrimental heavy metals contained in the fly ash, the following methods are known:

(1) A method comprising adding cement and water to the fly ash and kneading the mixture into a lump;

(2) A method comprising adding molten asphalt to the fly ash and kneading the mixture into a lump;

(3) A method comprising placing the fly ash in a tank containing water, neutralizing the mixture by means of an exhaust gas from an incinerator blown into the tank to convert heavy metals in the fly ash into insoluble compounds, then removing water, and forming the insoluble compounds into a lump; and (4) a method comprising adding an acid and a sulfide to the fly ash to convert heavy metals into insoluble compounds, then removing water, and forming the insoluble compounds into a lump.

The method (1) above of forming the fly ash into a lump by means of cement has the following problem: because of the high alkalinity of cement, after dumping heavy metals such as lead, which are easily soluble into a liquid having a high pH value, may be dissolved from the lumpy fly ash under the effect of rain water, for example. An increased amount of added cement results in the dissolution of salts contained in the fly ash in rain fall, thus making the lumpy fly ash porous. The lumpy fly ash tends therefore to easily collapse.

The method (2) above of forming the fly ash into a lump by means of molten asphalt has the following problem: when the fly ash has a high alkalinity, after dumping, heavy metals may be dissolved from the lumpy fly ash as described above under the effect of rain water.

The method (3) above of treating heavy metals contained in the fly ash through neutralization has the following problem: the steps for neutralizing, dewatering and treating waste water produced in dewatering require complicated facilities, thus leading to a high cost.

The method (4) above of treating heavy metals contained in the fly ash by means of an acid has the following problem: the steps for acid treatment, dewatering and treating waste water produced in dewatering require complicated facilities, consuming much acid, thus resulting in a high cost.

Under such circumstances, there is a strong demand for the development of a method for making insoluble heavy metals contained in a fly ash, as collected from an exhaust gas discharged from an incinerator, easily and economically and stably for a long period of time, but such a method has not as yet been proposed.

SUMMARY OF THE INVENTION

An object of the present invention is therefore to provide a method for making insoluble heavy metals contained in a fly ash, as collected from an exhaust gas discharged from an incinerator, easily and economically and stably for a long period of time.

In accordance with one of the features of the present invention, there is provided a method for making insoluble heavy metals contained in a fly ash discharged from an incinerator, characterized by comprising the steps of:

adding a chelating agent comprising a high-molecular compound, together with water, to a fly ash containing detrimental heavy metals, as collected from an exhaust gas discharged from an incinerator, kneading these substances to form a kneaded mass, causing said heavy metals to react with said chelating agent in said kneaded mass to convert said heavy metals into water-insoluble chelate compounds, and coarsening said chelate compounds.

DETAILED DESCRIPTION OF PREFERRED EMBODIMENTS

Figure 1:
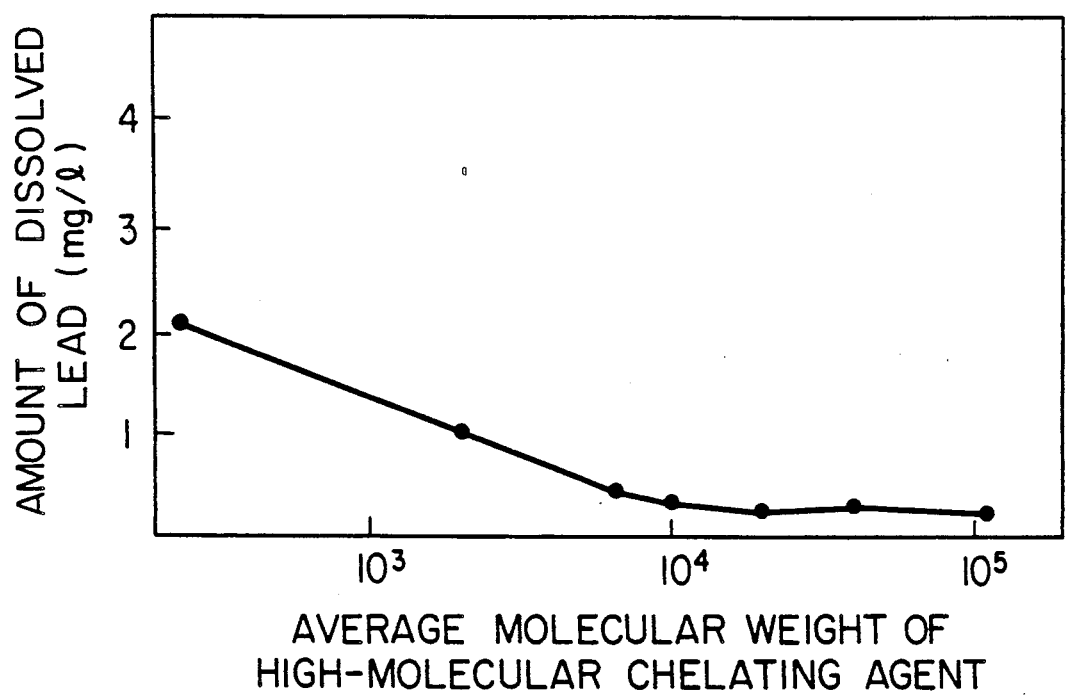
FIG. 1 is a graph illustrating, in a kneaded mass formed by adding a high-molecular chelating agent comprising a high-molecular compound, together with water, to a fly ash and kneading the mixture, the effect of an average molecular weight of the high-molecular chelating agent on an amount of dissolved lead from the kneaded mass.

From the above-mentioned point of view, extensive studies were carried out to develop a method for making insoluble heavy metals contained in a fly ash, as collected from an exhaust gas discharged from an incinerator, easily and economically and stably for a long period of time. As a result, the following findings were obtained: by adding a chelating agent comprising a high-molecular compound, together with water, to a fly ash containing heavy metals, or adding a chelating agent, a high-molecular compound and water to such a fly ash, and kneading the mixture, it is possible to convert the heavy metals into water-insoluble chelate compounds through the reactions with the chelating agent. Furthermore, these chelate compounds are captured into the network of the high-molecular compound, thus causing coarsening of these chelate compounds.

The present invention was developed on the basis of the above-mentioned findings. The method of the present invention for making insoluble heavy metals contained in a fly ash discharged from an incinerator is described below.

The chelating agent used in the present invention is as follows:

(1) A water-soluble low-molecular compound or a water-soluble high-molecular compound, which has at least one chelate-forming radical and converts the heavy metals contained in a fly ash into the water-insoluble chelate compounds through the reactions with the above-mentioned heavy metals.

As the above-mentioned chelating agent, a low-molecular compound or a high-molecular compound, which contains, for example, at least one of dithiocarbamate radical, thiol radical, xanthate radical and thioureide radical, is used.

(2) A water-insoluble low-molecular compound or a water-insoluble high-molecular compound, which has at least one chelate-forming radical and converts the heavy metals contained in a fly ash into the water-insoluble chelate compounds through the reactions with the above-mentioned heavy metals.

As the above-mentioned chelating agent, a low-molecular compound or a high-molecular compound, which contains, for example, at least one of amino acid radical (such as a glycine radical and an iminodiacetate radical), polyamino radical and phosphomethylamino radical, is used.

In the present invention, a chelating agent comprising a high-molecular compound selected from among the above-mentioned chelating agents, and water are added to a fly ash containing heavy metals, as collected from an exhaust gas discharged from an incinerator, and these substances are kneaded to form a kneaded mass. Or, the chelating agent comprising the above-mentioned low-molecular compound or the above-mentioned high-molecular compound, a high-molecular compound and water are added to such a fly ash, and these substances are kneaded to form a kneaded mass.

Even when the heavy metals contained in the fly ash are converted into the water-insoluble chelate compounds through the reactions with the chelating agent by adding the chelating agent and water to the fly ash, the particles of the chelate compounds may be dissolved if the particles of the chelate compounds are fine in size. Particularly, in the case where a fly ash is collected from an exhaust gas discharged from an incinerator prior to adding an alkaline substance to the exhaust gas to remove detrimental components such as hydrogen chloride and sulfur oxide contained in the exhaust gas, it is highly probable that fine particles of the chelate compounds are dissolved. However, by adding a chelating agent comprising a high-molecular compound to the fly ash or adding a chelating agent and a high-molecular compound to the fly ash in accordance with the method of the present invention, the particles of the chelate compounds are captured into the network of the high-molecular compound, thus leading to coarsening of the chelate compounds. It is therefore possible to prevent dissolution of the particles of the chelate compounds.

When adding the chelating agent comprising a high-molecular compound to the fly ash, the chelating agent should preferably have an average molecular weight of at least 10,000. As the chelating agent comprising such a high-molecular compound, for example, a chelating agent, in which a dithiocarbamate radical is combined with polyethylene or the like, is used.

FIG. 1 is a graph illustrating, in a kneaded mass formed by adding a high-molecular chelating agent comprising a high-molecular compound, together with water, to a fly ash and kneading the mixture, the effect of an average molecular weight of the high-molecular chelating agent on an amount of dissolved lead from the kneaded mass. More particularly, a plurality of kinds of chelating agent having a dithiocarbamate radical and having different average molecular weights were added in an amount of 0.5 equivalents relative to the amount of heavy metals contained in the fly ash, together with water, to the fly ash to form a plurality of kinds of kneaded mass, and an amount of dissolved lead from the kneaded mass was investigated for each of the thus formed plurality of kinds of kneaded mass. As a result, as is clear from FIG. 1, the amount of dissolved lead remarkably decreased in the case of a chelating agent comprising a high-molecular compound having an average molecular weight of at least 10,000.

Use of a plurality of kinds of chelating agent so as to be adapted to individual ones of a plurality of kinds of heavy metal contained in the fly ash, can promote formation of the chelate compounds and permits reduction of the amount of added chelating agents. The amounts of dissolved heavy metals were investigated, for each of a kneaded mass formed by adding two kinds of chelating agent, i.e., sodium diethyldithiocarbamate and amylxanthate, each in an amount of 0.5 equivalents relative to the amount of respective heavy metals contained in the fly ash, a kneaded mass formed by adding a single kind of chelating agent, i.e., sodium diethyldithiocarbamate in an amount of one equivalent relative to the amount of heavy metals contained in the fly ash, and a kneaded mass formed without adding any chelating agent. The results are shown in Table 2.

TABLE 2

| | (mg/l) | | | | |
|---|---|---|---|---|---|
| | Zn | Pb | Cr | Cd | Hg |
| Kneaded mass added with two kinds of chelating agent | 0.18 | 0.31 | up to 0.1 | up to 0.01 | up to 0.0005 |
| Kneaded mass added with a single kind of chelating agent | 0.85 | 0.61 | up to 0.1 | 0.11 | up to 0.0005 |
| Kneaded mass added with no chelating agent | 8.5 | 7.2 | 0.3 | 0.50 | 0.001 |

As is clear from Table 2, the amount of dissolved heavy metals, particularly zinc, considerably decreased in the case of the kneaded mass added with the two kinds of chelating agent as compared with the kneaded mass added with a single kind of chelating agent.

The above-mentioned decrease in the amount of dissolved heavy metals through addition of a plurality of kinds of chelating agent is attributable to the difference in preference to the reaction with heavy metals between the chelating agents. More specifically, an ordinary waste liquid, except for special ones containing a complexing agent, has relatively low contents of heavy metals, and there are relatively small differences in concentration between a plurality of heavy metals to be subjected to a treatment to make insoluble, except only for mercury. Unlike such an ordinary waste liquid, a fly ash discharged from an incinerator has high contents of heavy metals, with considerable differences in concentration between a plurality of heavy metals to be subjected to a treatment to make insoluble. It is therefore possible to further reduce the amount of dissolved heavy metals by forming a kneaded mass through addition to the fly ash of a plurality of kinds of chelating agent selected so as to be adapted to the respective heavy metals contained in the fly ash.

As the high-molecular compound to be added to the fly ash, together with the chelating agent and water, a water-soluble high-molecular compound or a latex-state high-molecular compound is used, which has the function of coarsening the chelate compounds and of making the fly ash water-insoluble or hard-water-soluble through the reactions with components of the fly ash.

Applicable water-soluble high-molecular compounds include, for example, polyvinyl alcohol, sodium alginate, polyacryl or compounds thereof, polyacrylamide or compounds thereof, chitosan or compounds thereof, polyamine or compounds thereof, cellulose or compounds thereof, aluminum polychloride and water glass.

Applicable latex-state high-molecular compounds include, for example, latex polymers of polyacryl or compounds thereof, polyacrylamide or compounds thereof, polyamine or compounds thereof, and styrene-butadiene or compounds thereof.

By further additionally adding a bridging agent to a fly ash, together with a chelating agent, a high-molecular compound and water, the network of the high-molecular compound is reinforced with the bridging agent. It is thus possible to further improve the coarsening effect of the chelate compounds brought by the high-molecular compound as described above.

When using polyvinyl alcohol as the high-molecular compound, for example, glyoxal is used as the bridging agent.

The amount of the chelating agent added to the fly ash may usually be up to one equivalent relative to the amount of heavy metals contained in the fly ash, while increasing the amount of the added chelating agent to over one equivalent relative to the amount of heavy metals, permits further reduction of the amount of dissolved heavy metals. The amount of the added chelating agent may therefore be increased as required to over one equivalent relative to the amount of heavy metals. In the case of a high-molecular chelating agent comprising a high-molecular compound having many chelate-forming radicals, however, the amount of the added chelating agent over a certain limit may rather cause the increase in the amount of dissolved heavy metals.

Figure 2:
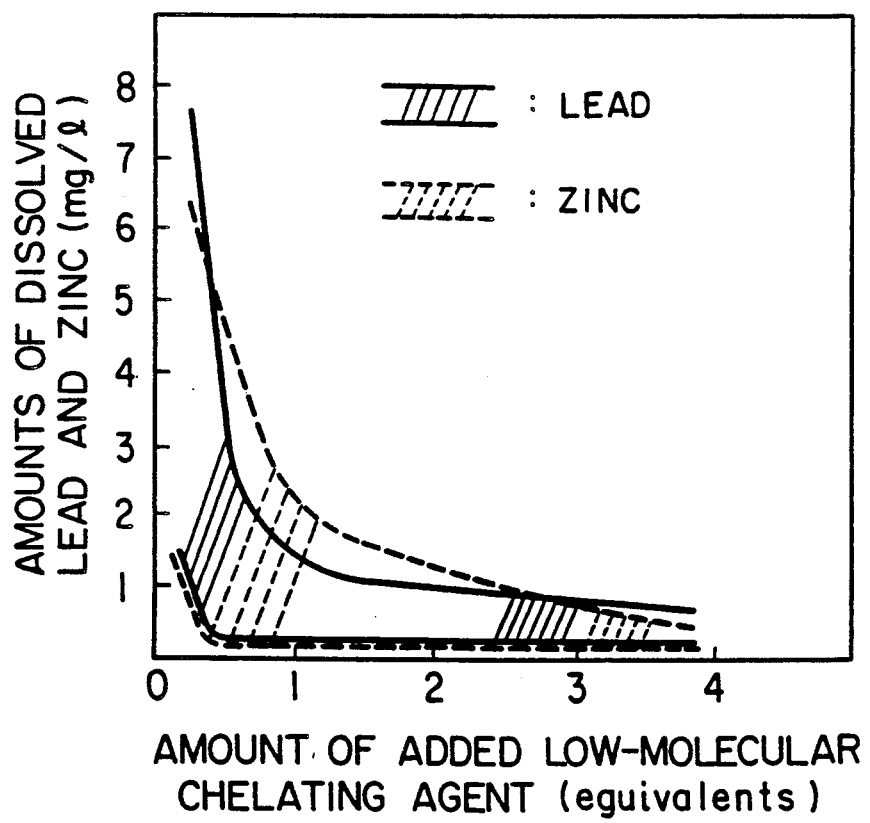
FIG. 2 is a graph illustrating, in a kneaded mass formed in accordance with the method of the present invention, by adding a low-molecular chelating agent comprising a low-molecular compound, together with a high-molecular compound and water, to a fly ash and kneading the mixture, the effect of amounts of the added low-molecular chelating agent on amounts of dissolved lead and zinc from the kneaded mass.

FIG. 2 is a graph illustrating, in a kneaded mass formed in accordance with the method of the present invention, by adding a low-molecular chelating agent comprising a low-molecular compound, together with a high-molecular compound and water, to a fly ash and kneading the mixture, the effect of an amount of the added low-molecular chelating agent on an amount of dissolved lead and zinc from the kneaded mass. As is clear from FIG. 2, the amount of dissolved lead and zinc decreases according as the amount of the added low-molecular chelating agent increases.

When adding the chelating agent comprising the high-molecular compound together with water, or the chelating agent, the high-molecular compound and water, to the fly ash and kneading the mixture to form a kneaded mass, the kneading time may be within the range of from about 3 to about 20 minutes if the chelating agent and the high-molecular compound are in a liquid state. When the chelating agent is in a powder form, the steps comprise adding the powdery chelating agent to the fly ash, mixing same, then adding water to the resultant mixture, and kneading the mixture. The mixing and kneading time in this case may be within the range of from about 5 to about 50 minutes in total. When simultaneously adding a powdery chelating agent and water to the fly ash and kneading the mixture, it is necessary to adopt a kneading time slightly longer than that described above. The high-molecular compound to be added together with the powdery chelating agent should preferably be in a liquid state. Upon kneading, hydration heat may cause the increase in temperature of the kneaded mass to about 80° C, but this does not affect the chelating reaction and the effect of making insoluble the resultant kneaded mass.

By adding the chelating agent comprising the high-molecular compound as the chelating agent to the fly ash, or adding the high-molecular compound to the fly ash together with the chelating agent, as described above, it is possible to coarsen the chelate compounds. Furthermore, the chelating agent comprising the high-molecular compound or the high-molecular compound added together with the chelating agent makes it easier for the kneaded mass to solidify, thus permitting prevention of outflow or splash of the kneaded mass after dumping thereof.

Dumping the kneaded mass in the form of a lump prepared through addition of cement to the kneaded mass formed in accordance with the method of the present invention, is more effective.

The amount of water added during forming the kneaded mass may be appropriately determined considering handling and transportation of the formed kneaded mass.

Now, the method of the present invention is described more in detail by means of an example in comparison with an example for comparison.

EXAMPLE

A kneaded mass (hereinafter referred to as the "sample of the invention No. 1") was prepared by adding a solution of a high-molecular chelating agent, in which a dithiocarbamate radical was combined with polyethylene, in an amount of 0.8 equivalents relative to the amount of heavy metals contained in a fly ash, and water in an amount of 250 ml, to 1 kg of the fly ash having the chemical composition shown in Table 3, as collected from an exhaust gas discharged from an incinerator, and kneading the mixture for five minutes by means of a mixer.

TABLE 3

(wt. %)

TABLE 3-continued

| SiO$_2$ | CaO | Fe$_2$O$_3$ | Al$_2$O$_3$ | SO$_3$ | MgO | Na | K | Cl |
|---|---|---|---|---|---|---|---|---|
| 18 | 15 | 5 | 18 | 5 | 5 | 6 | 7 | 15 |

| (mg/kg) | | | | |
|---|---|---|---|---|
| Zn | Cd | Pb | Total Cr | Total Hg |
| 18000 | 290 | 3800 | 410 | 5.8 |

Another kneaded mass (hereinafter referred to as the "sample of the invention No. 2") was prepared by adding a solution of a low-molecular chelating agent comprising sodium diethyldithiocarbamate in an amount of 0.8 equivalents relative to the amount of heavy metals contained in a fly ash, a solution of a high-molecular compound comprising polyvinyl alcohol in an amount of 10 g, glyoxal as the bridging agent in an amount of 2 g, and water in an amount of 250 ml, to 1 kg of the above-mentioned fly ash, and kneading the mixture for five minutes by means of a mixer.

For comparison purposes, a kneaded mass for comparison (hereinafter referred to as the "sample for comparison") was prepared by adding only water in an amount of 250 ml to 1 kg of the above-mentioned fly ash, and kneading the mixture for five minutes by means of a mixer.

The samples of the invention Nos. 1 and 2 and the samples for comparison prepared as described above were exposed outdoors for certain periods of time. The exposure periods were for one day, 10 days, 20 days, and 30 days. Each of the samples of the invention Nos. 1 and 2 and the samples for comparison exposed for different periods was placed in water, and the amounts of dissolved heavy metals from each of these samples were investigated. The results are shown in Table 4.

TABLE 4

| | | Exposure period (days) | Zn [mg/l] | Cd [mg/l] | Pb [mg/l] | Total Cr [mg/l] | Total Hg [ma/l] |
|---|---|---|---|---|---|---|---|
| Sample of the invention | 1 | 1 | 0.15 | up to 0.01 | 0.12 | trace | up to 0.0005 |
| | | 10 | 0.25 | up to 0.01 | 0.10 | trace | up to 0.0005 |
| | | 20 | 0.10 | up to 0.01 | 0.06 | trace | up to 0.0005 |
| | | 30 | 0.15 | up to 0.01 | 0.08 | trace | up to 0.0005 |
| | 2 | 1 | 0.10 | up to 0.01 | 0.07 | trace | up to 0.0005 |
| | | 10 | 0.10 | up to 0.01 | 0.07 | trace | up to 0.0005 |
| | | 20 | 0.05 | up to 0.01 | 0.06 | trace | up to 0.0005 |
| | | 30 | 0.10 | up to 0.01 | 0.04 | trace | up to 0.0005 |
| Sample for comparison | | 1 | 5.2 | 0.52 | 7.8 | 1.2 | 0.0006 |
| | | 10 | 5.1 | 0.50 | 7.3 | 0.8 | up to 0.0005 |
| | | 20 | 4.6 | 0.50 | 6.6 | 0.8 | up to 0.0005 |
| | | 30 | 4.9 | 0.55 | 4.8 | 0.8 | up to 0.0005 |

As is evident from Table 4, the amounts of dissolved heavy metals, particularly of zinc, cadmium and lead, from the samples of the invention Nos. 1 and 2 were remarkably smaller than those from the samples for comparison for any of the periods of exposure.

According to the method of the present invention, as described above in detail, it is possible to easily and economically and stably for a long period of time make insoluble heavy metals contained in a fly ash as collected from an exhaust gas discharged from an incinerator, thus providing industrially useful effects.

What is claimed is:

1. A method for insolubilizing at least one detrimental heavy metal contained in fly ash discharged from an incinerator, comprising the steps of:
    (a) adding at least one chelating agent comprising at least one high molecular weight compound having an average molecular weight of at least 10,000, in an amount of up to one equivalent relative to an amount of at least one detrimental heavy metal contained in a fly ash, together with water to said fly ash containing said at least one detrimental heavy metal, as collected by means of a dust collector from an exhaust gas discharged from an incinerator;
    (b) kneading the resultant substances from (a) to form a kneaded mass;
    (c) causing said at least one detrimental heavy metal to react with said at least one chelating agent in said kneaded mass to convert said at least one detrimental heavy metal into at least one water-insoluble chelate compound; and
    (d) capturing particles of said at least one chelate compound.

2. The method as claimed in claim 1 wherein:
said at least one high-molecular weight compound of step (a) comprises at least one radical selected from the group consisting of a dithiocarbamate radical, a thiol radical, a xanthate radical and a thioureide radical.

3. The method as claimed in claim 1 wherein:
said at least one high-molecular weight compound of step (a) comprises at least one radical selected from the group consisting of an amino acid radical, a polyamino radical and a phosphomethylamino radical.

4. The method as claimed in claim 1, 2 or 3 wherein:
said at least one chelating agent comprising said at least one high-molecular weight compound, which reacts with an individual one of said at least one heavy metal contained in said fly ash, forms said at least one water-insoluble heavy metal chelate compound.

5. A method for insolubilizing at least one heavy metal contained in a fly ash discharged from an incinerator, comprising the steps of:
    (a) adding at least one chelating agent comprising at least one high-molecular weight compound having an average molecular weight of at least 10,000 in an amount of up to one equivalent relative to an amount of at least one detrimental heavy metal contained in a fly ash, together with at least one other high-molecular weight compound having an average molecular weight of at least 10,000 and water, to said fly ash containing said at least one detrimental heavy metal, as collected by means of a dust collector from an exhaust gas discharged from an incinerator;
    (b) kneading the resultant substances from step (a) to form a kneaded mass;
    (c) causing said at least one heavy metal to react with said at least one chelating agent in said kneaded mass to convert said at least one heavy metal into at least one water-insoluble chelate compound; and
    (d) capturing particles of said at least one chelate compound into a network of said at least one high-molecular weight compound and said at least one other high-molecular weight compound.

6. The method as claimed in claim 5 wherein:
said at least one high-molecular weight compound of step (a) comprises at least one radical selected from the group consisting of a dithiocarbamate radical, a thiol radical, a xanthate radical and a thioureide radical.

7. The method as claimed in claim 5 wherein:
said at least one high-molecular weight compound of step (a) comprises at least one radical selected from the group consisting of an amino acid radical, a polyamino radical and a phosphomethylamino radical.

8. The method as claimed in claim 5, 6 or 7, wherein:
said at least one chelating agent comprising said at least one high-molecular weight compound, which reacts with an individual one of said at least one heavy metal contained in said fly ash, forms said at least one water-insoluble heavy metal chelate compound.

9. The method as claimed in claim 5, 6 or 7, wherein:
a bridging agent comprising glyoxal is additionally added to said fly ash, together with said at least one chelating agent comprising said at least one high-molecular weight compound and water.

10. The method as claimed in claim 8, wherein:
a bridging agent comprising glyoxal is additionally added to said fly ash, together with said at least one chelating agent comprising said at least one high-molecular weight compound and water.

11. The method as claimed in claims 5, 6 or 7, wherein:
said at least one other high-molecular weight compound comprises at least one selected from the group consisting of polyvinyl alcohol, sodium alginate, polyacrylamide and compounds thereof, chitosan and compounds thereof, polyamine and compounds thereof, cellulose and compounds thereof, aluminum polychloride, water glass and styrene-butadiene and compounds thereof.

12. The method as claimed in claim 8, wherein:
said at least one other high-molecular weight compound comprises at least one selected from the group consisting of polyvinyl alcohol, sodium alginate, polyacrylamide and compounds thereof, chitosan and compounds thereof, polyamine and compounds thereof, cellulose and compounds thereof, aluminum polychloride, water glass and styrene-butadiene and compounds thereof.

13. The method as claimed in claim 9, wherein:
said at least one other high-molecular weight compound comprises at least one selected from the group consisting of polyvinyl alcohol, sodium alginate, polyacrylamide and compounds thereof, chitosan and compounds thereof, polyamine and compounds thereof, cellulose and compounds thereof, aluminum polychloride, water glass and styrene-butadiene and compounds thereof.

14. The method as claimed in claim 10, wherein:
said at least one other high-molecular weight compound comprises at least one selected from the group consisting of polyvinyl alcohol, sodium alginate, polyacrylamide and compounds thereof, chitosan and compounds thereof, polyamine and compounds thereof, cellulose and compounds thereof, aluminum polychloride, water glass and styrene-butadiene and compounds thereof.

15. The method as claimed in claim 1, wherein the at least one detrimental heavy metal is selected from the group consisting of Zn, Cd, Pb, Cr and Hg.

16. The method as claimed in claim 15, wherein the at least one chelating agent comprises sodium diethyl dithiocarbamate combined with polyethylene, in an amount of 0.8 equivalents relative to the amount of the at least one heavy metal contained in the fly ash.

17. The method as claimed in claim 9, wherein the at least one detrimental heavy metal is selected from the group consisting of Zn, Cd, Pb, Cr and Hg.

18. The method as claimed in claim 15, wherein the at least one chelating agent comprises sodium diethyl dithiocarbamate in an amount of 0.8 equivalent relative to the amount of the at least one heavy metal contained in the fly ash and the at least one another chelating agent comprises polyvinyl alcohol.

19. The method as claimed in claim 1, wherein the at least one high-molecular weight compound is in an amount of 0.5 to 1 equivalents relative to the amount of the at least one heavy metal contained in the fly ash.

* * * * *

UNITED STATES PATENT AND TRADEMARK OFFICE
CERTIFICATE OF CORRECTION

PATENT NO.  : 5,092,931
DATED       : March 3, 1992
INVENTOR(S) : FUJISAWA et al It is certified that error appears in the above-identified patent and that said Letters Patent is hereby corrected as shown below:

Title page:
Section [54] first line of the title, replace
   "MAKING INSOLUBLE" with --INSOLUBILIZING--.

Column 8, line 25 (Claim 1, last line), after "compound",
   insert --into a network of said at least one high-
   molecular weight compound--.

Column 9, line 26 (Claim 9, last line) after "compound",
   insert --, said at least one other high-molecular
   weight compound--; and in the same line, insert
   --said-- before "water".

Column 9, line 31 (Claim 10, last line), after "compound",
   insert --, said at least one other high-molecular
   weight compound--; and in the same line, insert
   --said-- before "water".

Column 10, line 40 (Claim 18, last line), change
   "comprises" to --comprising--.

Signed and Sealed this

Seventeenth Day of August, 1993

*Attest:*

BRUCE LEHMAN

*Attesting Officer*   Commissioner of Patents and Trademarks